E. A. Goodes,
Nutmeg Grater,

No. 80,347. Patented July 28, 1868.

Witnesses,
Wm A Morgan
G. C. Colton

Inventor;
E. A. Goodes
per Murry &
Attorney

United States Patent Office.

E. A. GOODES, OF PHILADELPHIA, PENNSYLVANIA, ASSIGNOR TO HIMSELF, E. L. MILLER, AND W. H. MORFORD, OF SAME PLACE.

*Letters Patent No. 80,347, dated July 28, 1868.*

IMPROVED NUTMEG-GRATER.

*The Schedule referred to in these Letters Patent and making part of the same.*

TO ALL WHOM IT MAY CONCERN:

Be it known that I, E. A. GOODES, of Philadelphia, in the county of Philadelphia, and State of Pennsylvania, have invented a new and improved Vegetable-Grater; and I do hereby declare that the following is a full, clear, and exact description thereof, which will enable those skilled in the art to make and use the same, reference being had to the accompanying drawings, forming part of this specification, in which—

Figure 2 is a cross-section of the same, through the line $x\,x$, fig. 1.

Similar letters of reference indicate corresponding parts.

Figure 1:
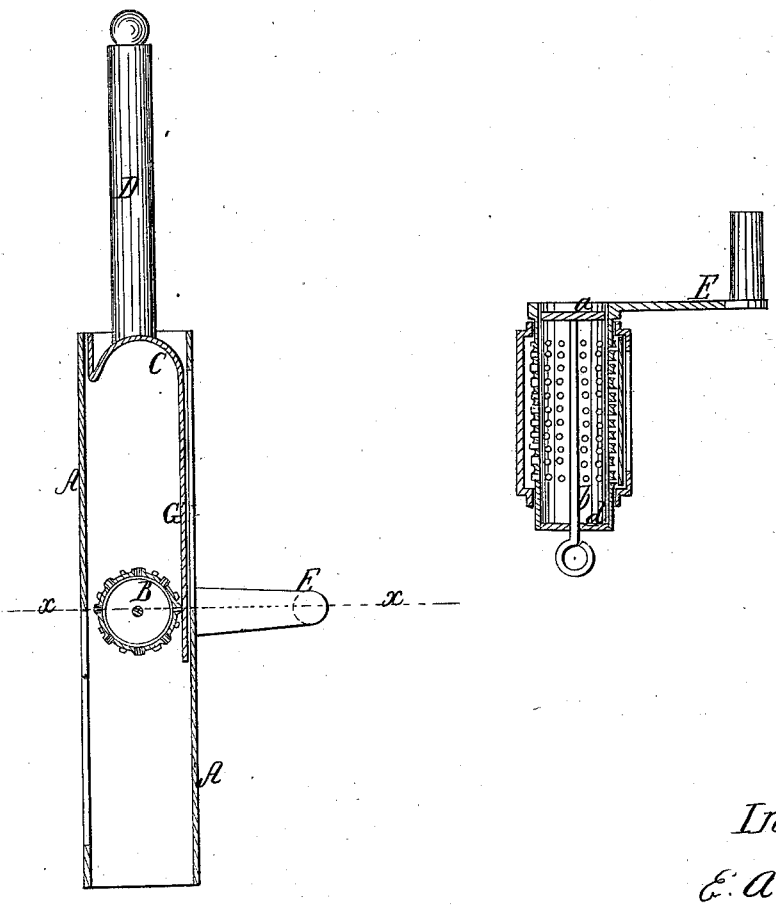
Figure 1 is a longitudinal section of my improved grater.

The object of this invention is to provide a machine for grating vegetables in an expeditious and easy manner. It consists of a case containing a grating-cylinder of pinched sheet metal, or other suitable substitute therefor, and arranged in such a manner that the vegetables will be brought in contact with the grating-cylinder, and the grated particles permitted to fall below into any suitable receptacle. The case is provided with a plunger for actuating the vegetables against the cylinder, and the latter is also provided with a plunger for clearing out the grated particles which may collect therein from time to time.

In the drawings—

A is the case, and

B the grating-cylinder, having bearings in the sides of the case.

E is a handle for rotating the cylinder.

C a is plunger, having an extension, G, and handle D. This plunger fits loosely within the case, and closes upon the contained vegetables, and actuates them down against the grating-cylinder B as the latter is turned.

$a$ is a plunger within the grating-cylinder, and is operated by a rod, $b$, working through a cross-bar, $d$, affixed across one end of the cylinder. The opposite end of the cylinder is open for the ejection of the grated particles by the plunger.

In operation, the grated particles pass the cylinder B and fall into the lower part of the case, which, in practice, is placed in or over any suitable vessel.

I claim as new, and desire to secure by Letters Patent—

The grater, consisting of the grating-cylinder B, provided with crank-handle E and plunger $a$, having rod $c$, and the plunger C G, with its handle D, all constructed and arranged within the case A to operate as herein shown and described for the purpose specified.

E. A. GOODES.

Witnesses:
FRANCIS M. WOOD,
HENRY F. HAYS.